US012602878B2

(12) United States Patent
Lawson

(10) Patent No.: US 12,602,878 B2
(45) Date of Patent: Apr. 14, 2026

(54) SYSTEM AND METHOD FOR MEASURING SPATIAL POSITIONING IN VIRTUAL REALITY DISPLAY

(71) Applicant: TRU Simulation + Training, Lutz, FL (US)

(72) Inventor: Matthew Edward Lawson, Wesley Chapel, FL (US)

(73) Assignee: TRU SIMULATION + TRAINING, Lutz, FL (US)

( * ) Notice: Subject to any disclaimer, the term of this patent is extended or adjusted under 35 U.S.C. 154(b) by 0 days.

(21) Appl. No.: 18/890,188

(22) Filed: Sep. 19, 2024

(65) Prior Publication Data

US 2026/0080628 A1 Mar. 19, 2026

(51) Int. Cl.
| | |
|---|---|
| *G06T 19/00* | (2011.01) |
| *G06F 3/01* | (2006.01) |
| *G06T 7/73* | (2017.01) |
| *G09B 9/08* | (2006.01) |

(52) U.S. Cl.
CPC .............. G06T 19/00 (2013.01); G06F 3/011 (2013.01); G06T 7/73 (2017.01); G09B 9/08 (2013.01)

(58) Field of Classification Search
CPC ........... G06T 19/00; G06T 7/73; G06F 3/011; G09B 9/08
See application file for complete search history.

(56) References Cited

U.S. PATENT DOCUMENTS

| | | | |
|---|---|---|---|
| 10,884,525 B1 | 1/2021 | Vonsik et al. | |
| 2005/0174361 A1* | 8/2005 | Kobayashi | G06F 3/012 |
| | | | 345/633 |
| 2011/0183301 A1* | 7/2011 | Turner | G09B 9/302 |
| | | | 434/43 |
| 2013/0257904 A1* | 10/2013 | Roth | G06F 3/012 |
| | | | 345/629 |
| 2014/0071165 A1* | 3/2014 | Tuchschmid | G06T 19/006 |
| | | | 345/633 |
| 2019/0088024 A1* | 3/2019 | Kobayashi | G06T 7/593 |
| 2023/0267590 A1 | 8/2023 | Goergen et al. | |
| 2025/0104364 A1* | 3/2025 | Yu | G06T 19/006 |

FOREIGN PATENT DOCUMENTS

CN 110349472 B 8/2021

* cited by examiner

*Primary Examiner* — Stephen G Sherman
(74) *Attorney, Agent, or Firm* — SLATER MATSIL, LLP

(57) ABSTRACT

A method for testing overlay of a virtual environment to a physical environment that includes generating a target to identify a virtual reference point in a virtual environment. The virtual reference point corresponds to a physical element in a physical environment. A virtual reference point position is recorded. The target is projected on the virtual reference point to a user through a head mounted display. The user identifies the target. The method can continue with projecting the physical environment to the user, and monitoring a physical pointer of the user that is contacting the physical element in the physical environment that corresponds to the virtual reference point. A virtual pointer may be generated in the virtual environment corresponding to the physical pointer of the user. A vector can then be measured characterizing a difference between a position of the virtual pointer and the virtual reference point position.

20 Claims, 11 Drawing Sheets

100

2000

SYSTEM AND METHOD FOR MEASURING SPATIAL POSITIONING IN VIRTUAL REALITY DISPLAY

TECHNICAL FIELD

The present invention relates generally to measuring spatial positioning in a virtual reality environment, and in particular embodiments, to physical/virtual overlay alignment.

BACKGROUND

Flight simulator testing technology has evolved with the incorporation of head mounted displays (HMDs), bringing new challenges and opportunities for creating immersive training environments. Such simulations involve a blend of sophisticated hardware and software solutions to ensure a realistic and effective simulation experience.

At the core of these systems are advanced motion facilitating and tracking technologies, including the use of such technologies to provide the realistic output for displaying to the head mounted display (HMD) and otherwise. Such technologies typically combine optical systems using cameras and sensors, providing precise positioning of elements being modeled in the virtual environment to physical elements in the physical environment. This tracking is crucial for rendering accurate visuals in the head mounted display (HMD) as the user moves within a testing apparatus.

Determining the accuracy of a viewpoint associated with a simulation apparatus, however, has remained challenging to ensure that such simulations remain sufficiently accurate for acceptable level of realistic simulating.

SUMMARY

Technical advantages are generally achieved by embodiments of this disclosure which describe measuring spatial positioning in a virtual reality display. In accordance with a first aspect of the disclosure, a method is provided. In some embodiments, the method for testing overlay of a virtual environment to a physical environment includes generating a target to identify a virtual reference point in a virtual environment. The virtual reference point corresponds to a physical element in a physical environment. A virtual reference point position of the virtual reference point is recorded. The method further includes projecting the target on the virtual reference point in the virtual environment to a user through a head mounted display, wherein the user identifies the target, projecting the physical environment to the user through the head mounted display, and monitoring a physical pointer of the user that is contacting the physical element in the physical environment that corresponds to the virtual reference point identified by the target. A virtual pointer may be generated in the virtual environment corresponding to the physical pointer of the user. A vector can then be measured characterizing a difference between a position of the virtual pointer and the virtual reference point position in the virtual environment.

In an embodiment, measuring the vector characterizing the difference between the position of the virtual pointer and the virtual reference point position comprises measuring a difference between a plurality of the virtual reference point position and a plurality of the virtual pointer that corresponds to a plurality of the target.

In an embodiment, a failure of overlay between the virtual model in the virtual environment and the physical element in the physical environment is characterized by the vector characterizing the difference between the position of the virtual pointer and the virtual reference point position, when the vector is greater than 10 mm.

In an embodiment, the virtual environment includes computer generated graphics of a simulation for driving a vehicle.

In an embodiment, projecting of the physical environment to the user through the head mounted display includes a live video stream of the physical environment. In some embodiments, the physical environment comprises a tactile cockpit. In some embodiments, the physical elements are located on the tactile cockpit, the physical elements comprising displays, switchgear, or controls.

In an embodiment, the monitoring of the physical pointer of the user that is contacting the physical element in the physical environment that corresponds to the virtual reference point identified by the target includes LiDar. LiDar is provided by a sensor integrated into the head mounted display.

In some embodiments, generating the virtual pointer in the virtual environment corresponding to the physical pointer of the user includes the user placing their index finger on the physical element in the physical environment that corresponds to the virtual reference point for greater than three seconds.

In some embodiments, when the difference between the plurality of the virtual reference point position and the plurality of the virtual pointer that corresponds to the plurality of the target indicates the failure of the overlay between the virtual model in the virtual environment and the physical element in the physical environment, the method can further include adjusting the virtual environment to reduce a value of the vector characterizing the difference between the position of the virtual pointer and the virtual reference point position.

In accordance with another aspect of the disclosure, an apparatus is provided. In some embodiments, the apparatus includes at least one processor, and at least one memory having computer program instructions stored thereon. In some embodiments, the computer program instructions in execution with the at least one processor, causes the apparatus to generate a target to identify a virtual reference point in a virtual environment. The virtual reference point corresponds to a physical element in a physical environment, wherein a virtual reference point position of the virtual reference point is recorded. The computer program instructions can further cause the apparatus to project the target on the virtual reference point in the virtual environment to a user through a head mounted display, and project the physical environment to the user through the head mounted display. The computer program instructions can also monitor a physical pointer of the user that is contacting the physical element in the physical environment that corresponds to the virtual reference point identified by the target. The computer program instructions can also generate a virtual pointer in the virtual environment corresponding to the physical pointer of the user, and measure a vector characterizing a different between a position of the virtual pointer and the virtual reference point position in the virtual environment.

In some embodiments, a failure of overlay between the virtual model in the virtual environment and the physical element in the physical environment is characterized by the apparatus from a vector characterizing the difference between the position of the virtual pointer and the virtual reference point position that is greater than 10 mm.

In an embodiment, the virtual environment includes computer generated graphics of a simulation for driving a vehicle. In some embodiments, the physical environment projected to the user through the head mounted display includes a live video stream. In some embodiments, the physical environment includes a tactile cockpit. In some embodiments, the physical elements are located on the tactile cockpit, the physical elements comprising displays, switchgear, or controls.

In some embodiments, the apparatus can provide that the physical pointer of the user that is contacting the physical element in the physical environment that corresponds to the virtual reference point identified by the target is recorded by LiDar provided by a sensor integrated into the head mounted display.

In yet another aspect, a computer program product may be provided. For example, at least one non-transitory computer-readable storage medium can be provided having computer program instructions stored thereon that, in execution with at least one processor, is configured for generating a target to identify a virtual reference point in a virtual environment, the virtual reference point corresponds to a physical element in a physical environment. In some embodiments, a virtual reference point position of the virtual reference point is recorded. In some embodiments, the instructions when executed can further project the target on the virtual reference point in the virtual environment to a user through a head mounted display, wherein the user identifies the target. In some embodiments, the instructions when executed project the physical environment to the user through the head mounted display. The instructions on the non-transitory computer-readable storage medium can also include monitoring a physical pointer of the user that is contacting the physical element in the physical environment that corresponds to the virtual reference point identified by the target; and generating a virtual pointer in the virtual environment corresponding to the physical pointer of the user. In some embodiments, the instructions when executed can include measuring a vector characterizing a different between a position of the virtual pointer and the virtual reference point position in the virtual environment.

In some embodiments, the at least one non-transitory computer readable storage medium can also include instructions for measuring the vector characterizing the difference between the position of the virtual pointer and the virtual reference point position, in which the instructions include measuring a difference between a plurality of the virtual reference point position and a plurality of the virtual pointer that corresponds to a plurality of the target.

BRIEF DESCRIPTION OF THE DRAWINGS

For a more complete understanding of the present invention, and the advantages thereof, reference is now made to the following descriptions taken in conjunction with the accompanying drawings, in which.

DETAILED DESCRIPTION OF ILLUSTRATIVE EMBODIMENTS

Figure 1:
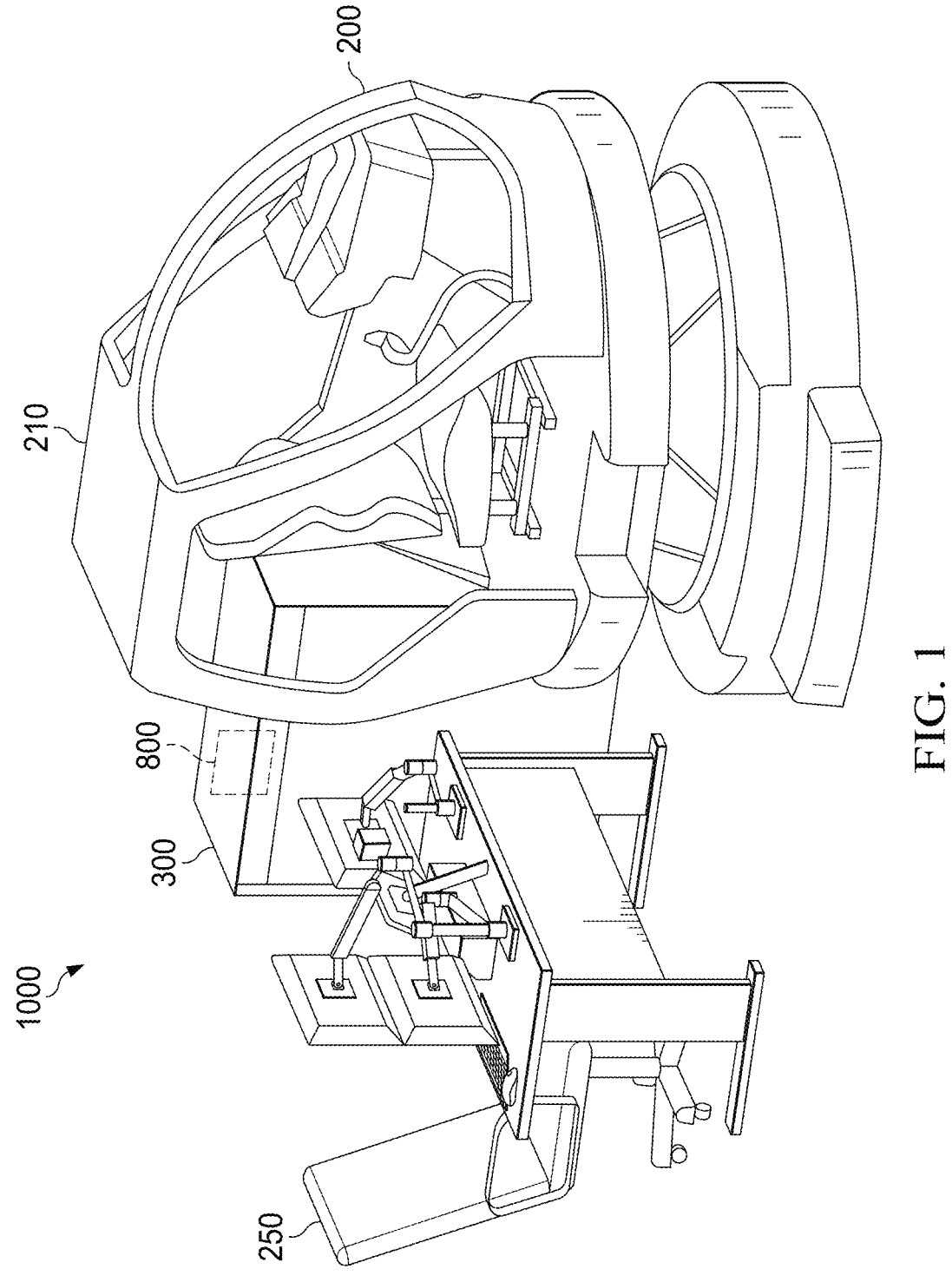
FIG. 1 is a perspective view of the components for a simulation environment according to some embodiments.

The making and using of embodiments of this disclosure are discussed in detail below. It should be appreciated, however, that the concepts disclosed herein can be embodied in a wide variety of specific contexts, and that the specific embodiments discussed herein are merely illustrative and do not serve to limit the scope of the claims. Further, it should be understood that various changes, substitutions, and/or alterations can be made herein without departing from the spirit and scope of this disclosure as defined by the appended claims.

Embodiments of the present disclosure include methods (e.g., computer implemented methods), devices, and non-transitory computer-readable storage media that utilize particular elements to measure and quantify how closely spatial position of virtual hands relative to virtual environment models match the spatial position of a user's physical hands relative to physical objects and surfaces in the physical environment. In some embodiments, high accuracy of this relationship can facilitate performance of tasks and procedures in virtual reality that incorporate tactile sensory stimulus, such as virtual reality environments used in simulations, such as flight simulation applications. In some embodiments, a testing methodology is provided that includes a head mounted display (HMD), and physical reference points to physical elements surrounding the user of the head mounted display (HMD) that are relevant to the virtual experience, e.g., a virtual flight simulation. In some embodiments, the virtual environment includes virtual models of the physical elements surrounding the user. As will be further described below, the virtual environment for the testing methods described herein include virtual reference points, each designated by a target symbol, e.g., a brightly colored target symbol, that are used to align elements in the virtual environment and the physical environment.

The "virtual environment" is an artificial environment which is experienced by the user through sensory stimuli, such as sights and sounds, provided by a computer, e.g., image generator, in which the user's actions partially determine what happens in the environment. At least some of the sights for the virtual experience are projected to the user through the head mounted display (HMD).

The "physical environment" includes the physical elements through which a user can physically contact and manipulate, which corresponds to the virtual models of the virtual environment. As will be further described below, the physical elements to which virtual models are to be aligned by testing methods described herein, can be controls, gauges, switchgear or any element requiring user input in the applications of vehicle control simulations. As will be described further below, methods (e.g., computer implemented methods), devices, and non-transitory computer-readable storage media can provide for the integration of hand tracking spatial accuracy validation and physical/virtual overlay alignment validation in a single test.

FIG. 1 illustrates one embodiment of a simulator environment 1000, in which the methods (e.g., computer implemented methods), devices, and non-transitory computer-readable storage media may be employed. Referring to FIG. 1, in some embodiments, the simulator environment 1000 includes a simulator station 200 (including a simulator station housing (frame) 210), an instructor station 250, virtual reality sensors and an image generator (IG) 300.

Figure 2:
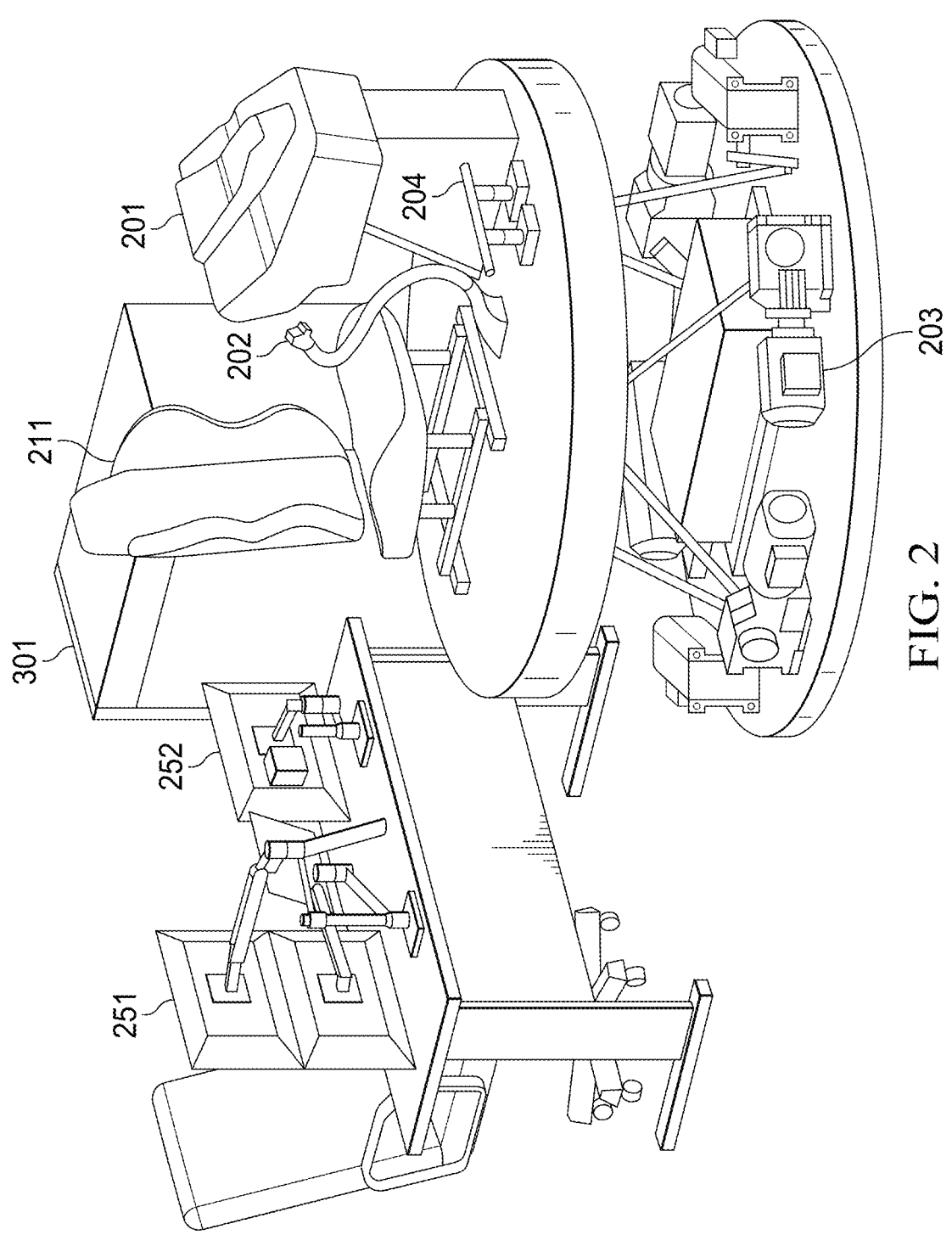
FIG. 2 is a perspective view of the simulation environment, in which the simulation vehicle body has been removed according to some embodiments.

FIG. 2 further illustrates the elements of the simulator station 200 after removing the simulator station housing (frame) 210 to further illustrate the elements of the simulator station 200 that are housed therein. In some embodiments, the simulator station 200 further includes tactile cockpit 201, primary controls 202, and user seat 211. The simulator station 200 is also configured to provide that all of the input/outputs 204 to the tactile cockpit 201 are through a single location, e.g., conduit, between the simulator station 200 and the instructor station 250. The input/outputs 204 are also in connection with the image generator (IG) 300. The simulator station 200 can further include a motion system 203. The motion system 203 can include a plurality of motors and actuators for moving the simulator station 200 in connection with a simulation including the virtual environment.

Figure 6:
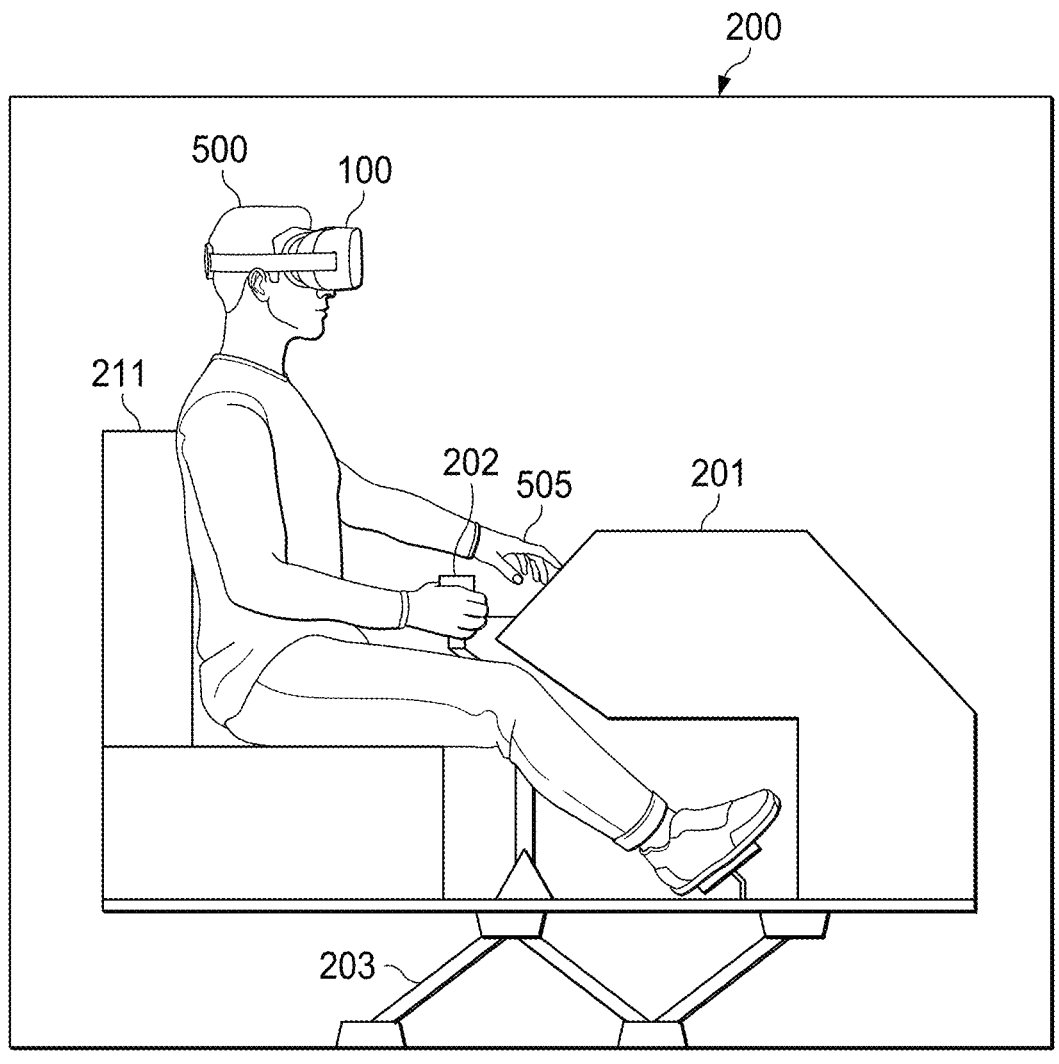
FIG. 6 is an illustration of a user taking the seated position for performing a testing method for measuring spatial positioning in a virtual reality environment, in accordance with some embodiments.

FIG. 2 further illustrates that the instructor station 250 can include an instructor station interface 251, and a student view repeater 252. The instructor station interface 251 includes an interface, e.g., display and data input device, e.g., keyboard and/or mouse/touch input, through which the instructor can issue commands and receive data regarding the running of the simulation. The student view repeater 252 also includes a display, which can be used for displaying to the instructor, the viewpoint of the student during the running of the simulation. For example, a user 500 (as depicted in FIG. 6) is the pilot/driver of the simulation, whereas an operator running the simulation to be driven by the user 500 operates from the instructor station 250. The operator may run tests for measuring spatial positioning in a virtual reality environment from the instructor station 250 in combination with the user 500 wearing the head mounted display (HMD) 100 can respond to instructions for measurements during the test. In other embodiments, the user 500 (as depicted in FIG. 6) wearing the head mounted display (HMD) 100 can run tests for measuring spatial positioning in a virtual reality environment.

Figure 3A:
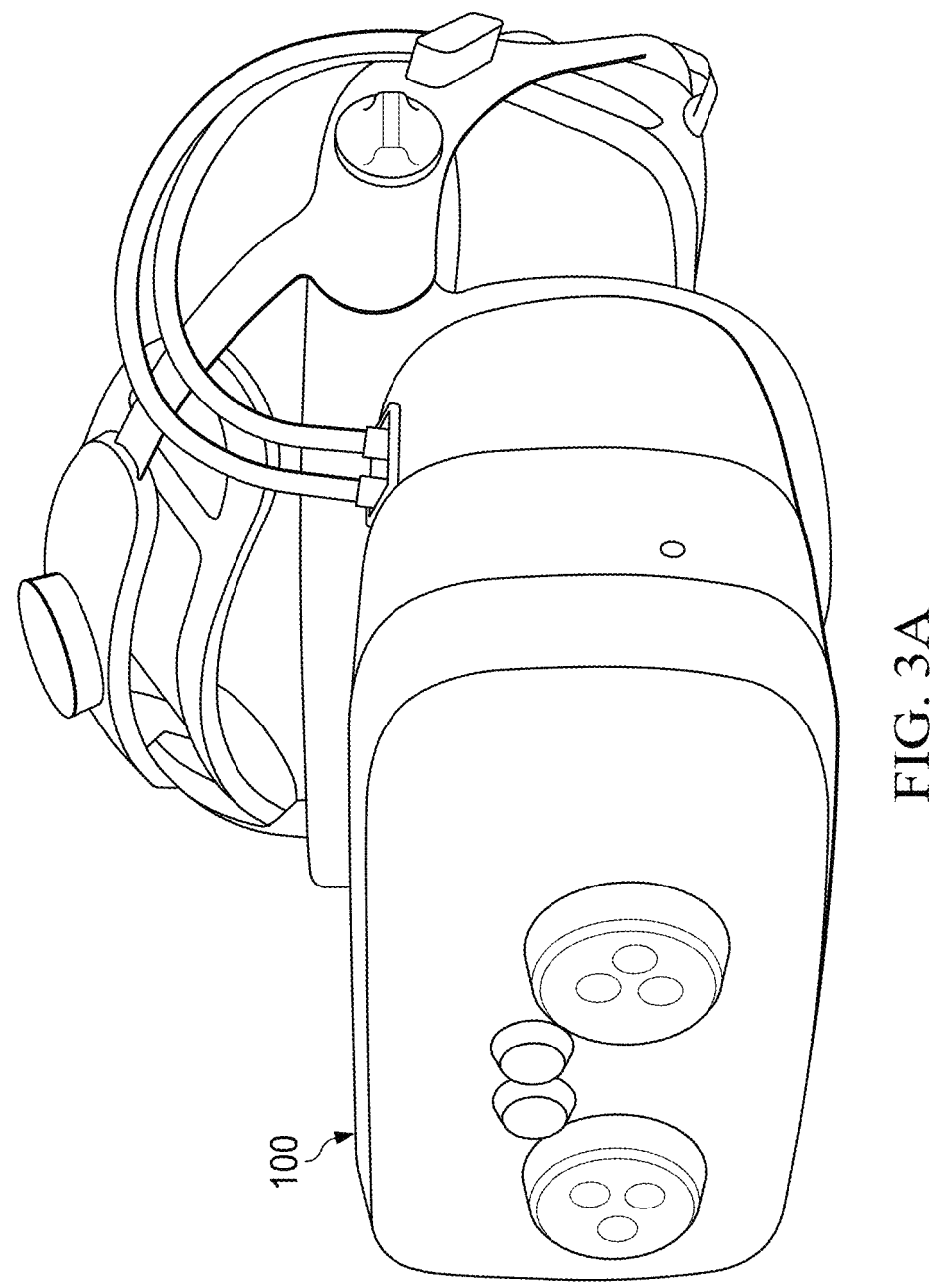
FIG. 3A is a perspective view of a head mounted display (HMD), in accordance with some embodiments.
Figure 3B:
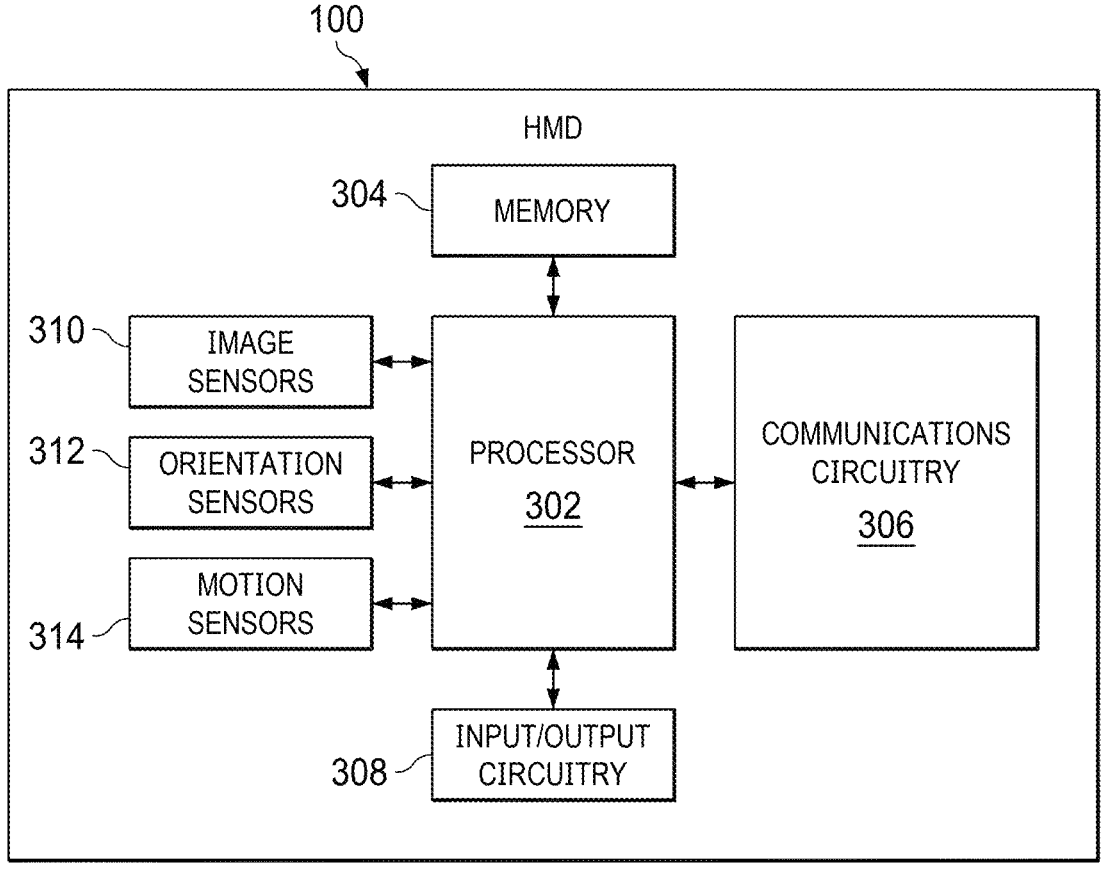
FIG. 3B is a block diagram illustrating some components of the head mounted display (HMD) depicted in FIG. 3A according to some embodiments.

As noted above, a user seated in the user seat 211 will interact to the simulation through a virtual environment that is provided through a head mounted display (HMD) 100, as depicted in FIGS. 3A and 3B. More particularly, at least some of the sights for the virtual experience during the simulation are provided through the head mounted display (HMD) 100. In some embodiments, the methods (e.g., computer implemented methods), devices, and non-transitory computer-readable storage media described herein provide a testing methodology that ensures that alignment of the virtual overlays for the virtual models being projected to the user through the head mounted display (HMD) 100 and physical reference points relating to physical elements surrounding the user that are relevant to the virtual experience. As will be further described below, the physical elements to which virtual models are to be aligned by testing methods that are described herein, can be controls, gauges, switchgear or any element, such as those physical elements of the tactile cockpit 201, and primary controls 202 that are provided within the simulator station 200, as depicted in FIG. 2. These physical elements can provide tactile feel to the user during the simulation for the controls requiring user input in the applications of the simulation that the user is interacting with through a virtual environment that is provided by at least the head mounted display (HMD) 100. In some embodiments, the physical elements can be controls, gauges, switchgear or any element requiring user input in the applications of vehicle control simulations, that the user can touch, e.g., physically touch. In some embodiments, the head mounted display (HMD) 100 can project to the user 500 both the virtual environment that is generated by the image generator (IG) 300, and can project to the user 500 a video of the physical environment that may be recorded by cameras, e.g., video cameras, that are integrated into the head mounted display (HMD) 100 and/or the VR sensor 800.

In some embodiments, a head mounted display (HMD) 100 is a display device, which can be worn on the head or as part of a helmet (see helmet-mounted display for aviation applications), that can include a small display optic in front of one (monocular HMD) or each eye (binocular HMD). Virtual reality headsets are a type of head mounted display (HMD) that track 3D position and rotation to provide a virtual environment to the user. An optical head-mounted display (OHMD) is a wearable display that can reflect projected images and allows a user to see through it.

In some embodiments, the head mounted display (HMD) 100 has one or two small displays, with lenses and semi-transparent mirrors embedded in eyeglasses (also termed data glasses), a visor, or a helmet. The display units are miniaturized and may include cathode ray tubes (CRT), liquid-crystal displays (LCDs), liquid crystal on silicon (LCos), or organic light-emitting diodes (OLED).

Head mounted display (HMDs) 100 may be employed in the methods, systems and computer program products that can differ in whether they can display only computer-generated imagery (CGI) (of the virtual environment), or only live imagery from the physical world (of the physical environment), or a combination thereof. In some embodiments, combining real-world view with CGI can be done by projecting the CGI through a partially reflective mirror and viewing the real world directly. This method is often called optical see-through. Combining real-world view with CGI can also be done electronically by accepting video from a camera and mixing it electronically with CGI. By using AR technology, the head mounted display (HMDs) are allowed to achieve a see-through display.

In some embodiments, the head mounted display (HMD) 100 may be an optical head-mounted display. An optical head-mounted display uses an optical mixer which is made of partly silvered mirrors. It can reflect artificial images, and let real images cross the lens, and let a user look through it. Various methods have existed for see-through head mounted displays (HMDs), some of which can be summarized into two main families based on curved mirrors or waveguides.

In some embodiments, the head mounted display (HMD) 100 is a mixed reality headset. Mixed Reality (MR) is a view of the real world—physical world—with an overlay of digital elements where physical and digital elements can interact.

In one example, the head mounted display (HMD) 100 may be a mixed reality headset having close to human-eye resolution with over 70 pixels per degree (PPD), and can have a 115-degree field of view. The head mounted display (HMD) 100 can have integrated 200 Hz eye tracking and Ultraleap™ hand tracking.

In some embodiments, the head mounted display (HMD) 100 may be equipped with LiDar. LiDar is a method for determining ranges by targeting an object or a surface with a laser and measuring the time for the reflected light to return to the receiver. In some embodiments, of the head mounted display (HMD) 100, the LiDar sensor works in conjunction with a RGB video feed to provide precise depth awareness and real-time 3D environment reconstruction, which can be used in the alignment of overlays, e.g., the integration of hand tracking spatial accuracy validation and physical/virtual overlay alignment validation in a single test. In some embodiments, the LiDar system of the head mounted display (HMD) 100 operates within a range of 40 cm to 5 meters, allowing for accurate hand, object, and people occlusion. The RGB video feed may be provided from one or more cameras also integrated into the head mounted display (HMD) 100 that can provide a video of the physical environment to the user, e.g., in real time.

FIG. 3B illustrates a block diagram of an example head mounted display (HMD) 100, in accordance with at least one aspect of the disclosure. Specifically, FIG. 3B depicts an example apparatus embodying an example of the head mounted display (HMD) 100. FIG. 3B may further elaborate on some of the elements within the head mounted display (HMD) 100 depicted in FIG. 3A. In some embodiments, the block diagram of the head mounted display (HMD) 100 further provide addition elements not previously described. The head mounted display (HMD) 100 can includes a processor 302, a memory 304, a communications circuitry 306, an input/output circuitry 308, one or more image sensors 310, one or more orientation sensors 312, and/or one or more motion sensors 314. The apparatus 300 may be configured, using one or more of the circuitry depicted, to execute the operations described herein.

Although the components are described with respect to functional limitations, it should be understood that the particular implementations necessarily include the use of particular hardware. It should also be understood that certain components described herein may include similar or common hardware. For example, two sets of circuitry and/or modules may both leverage use of the same processor, network interface, storage medium, or the like to perform their associated functions, such that duplicate hardware is not required for each set of circuitry. The use of the term "module" and/or the term "circuitry" as used herein with respect to components of the apparatus 100 should therefore be understood to include particular hardware configured to perform the functions associated with the particular sets of circuitry as described herein.

Additionally or alternatively, the terms "circuitry" and "module" should be understood broadly to include hardware and, in some embodiments, software and/or firmware for configuring the hardware. For example, in some embodiments "circuitry" and "module" may include processing circuitry, non-transitory storage media, network interfaces, input/output devices, and/or the like. In some embodiments, other elements of the apparatus 100 may provide or supplement the functionality of the particular set of circuitry. The processor 302 may provide processing functionality, the memory 304 may provide processing functionality, the memory 304 may provide storage functionality, the communications circuitry 306 may provide network interface functionality, and the like.

In some embodiments, the processor 302 (and/or processor or any other processing circuitry assisting or otherwise associated with the processor) may be in communication with the memory 304 via a bus 102 for passing information among components of the apparatus 100. The memory 304 may be non-transitory and may include, for example, one or more volatile and/or non-volatile memories. In other words, for example, the memory may be an electronic storage device (e.g., a computer readable storage medium). The memory 304 may be configured to store information, data, content, applications, instructions, or the like, for enabling the apparatus 100 to carry out various functions in accordance with example embodiments of the present disclosure.

The processor 302 may be embodied in any one or more of a myriad of ways and may, for example, include one or more processing devices configured to perform independently. Additionally or alternatively, the processor 302 may include one or more processors configured in tandem via a bus to enable independent execution of instructions, pipelining, and/or multithreading. The use of the terms "processor," "processing module," and "processing circuitry" may be understood to include a single-core processor, a multi-core processor, multiple processors internal to the apparatus, field-programmable gate array(s) (FPGA(s)), graphic processing unit(s) (GPU(s)), application specific integrated circuit(s) (ASIC(s)), and/or remote and/or "cloud" processors.

One or more processor 302 and the one or more computer readable medium (such as memory 304) storing computer code thereon may be integrated into a controller, which can be an element of the HMD 100. References to computer-readable storage medium, computer program product, tangibly embodied computer program, or the like, or a controller, monitor, engine monitor, monitoring system, computer, processor, or the like should be understood to encompass not only computers having different architectures such as single or multi-processor architectures and sequential (Von Neumann) or parallel architectures but also specialized circuits such as field-programmable gate arrays (FPGAs), application specific circuits (ASICs), signal processing devices and other devices. References to computer program, instructions, code, or the like, should be understood to encompass software for a programmable processor or firmware such as, for example, the programmable content of a hardware device whether instructions for a processor, or configuration settings for a fixed-function device, gate array or programmable logic device, or the like.

The controller may have at least one processor 302 and at least one memory 304, such as a non-transitory computer readable medium, and may include computer program code, that is configured to, with the at least one processor, perform the method described herein. The memory 304 may be a single component or it may be implemented as one or more separate components some or all of which may be integrated or removable and may provide permanent, semi-permanent, dynamic, or cached storage. The one or more processors 302 are configured to read from and write to the at least one memory 304. The processor may also comprise a bus 155 or an output interface via which data or commands are output by the processor 302 and an input interface via which data or commands are input to the processor 302. The memory 304 stores a computer program including computer program instructions that control the operation of controller, when loaded into the processor. The computer program instructions provide the logic and routines that enable the apparatus to perform the simulation testing methods described herein. The processor 302, by reading the memory 304, is able to load and execute the computer program. The computer program or programs may arrive at the apparatus via any suitable delivery mechanism. The delivery mechanism may be, for example, a computer-readable storage medium, a computer program product, a memory device, a record medium such as a compact disc read on only memory (CD-ROM), digital versatile disc (DVD), portable memory such as a memory stick or hard drive, or the like, an article of manufacture that tangibly embodies the computer program. In some embodiments, the delivery mechanism may be a signal configured to reliably transfer the computer program over the air or via an electrical connection.

In an example embodiment, the processor 302 may be configured to execute computer-coded instructions stored in the memory 304 or otherwise accessible to the processor. Alternatively, or additionally, the processor 302 may be configured to execute hard-coded functionality. As such, whether configured by hardware or software methods, or by a combination thereof, the processor 302 may represent an entity (e.g., physically embodied in circuitry) capable of performing operations according to an embodiment of the present disclosure while configured accordingly. Alternatively, as another example, when the processor is embodied as an executor of software instructions, the instructions may specially configure the processor to perform the algorithms and/or operations described herein when the instructions are executed.

As one example context, the processor 302 may be configured to record, measure, and/or provide data associated with the orientation, position, movement, and/or elements associated with interacting with the head mounted display (HMD). Additionally or alternatively, in some embodiments, the processor 302 may be configured to output a virtual environment. The processor 302 outputs the virtual environment. In some embodiments, the processor 302 works in combination with the image generator 300 to provide the virtual environment. The processor 302 may be configured to allow for the head mounted display (HMD) to switch between projecting a virtual environment to the user from the image generator 300, and projecting a physical environment to the user from video camera feeds.

In some embodiments, the apparatus 100 may include input/output module 308 that may, in turn, be in communication with processor 302 to provide output to the user and in some embodiments, to receive an indication of one or more user inputs. The input/output module 308 may comprise a user interface and may include a display (e.g., for rendering one or more user interfaces, such as to the display). The user interfaces comprise a web user interface, customized device application, native device interface, a mobile and/or desktop application, or in some embodiments includes a client device linked or otherwise networked to an associated system configuring the virtual environment. In some embodiments, the input/output module 308 may also include gesture controls, soft keys, buttons, a microphone, a speaker, touch areas, and/or other input/output mechanisms. The processor, such as the processor 302, and/or the user interface circuitry comprising the processor, for example processor 302, may be configured to control one or more functions of one or more user interface elements through computer program instructions (e.g., software and/or firmware) stored on a memory accessible to the processor 302 (e.g., via memory 304, and/or the like).

The communications circuitry 306 may be any means, including for example and without limitation a device or circuitry embodied in hardware, software, firmware, and/or any combination thereof, which is configured to receive and/or transmit data from and/or to a network and/or any other device, circuitry, or module in communication with the apparatus, e.g., head mounted display (HMD) 100. In this regard, the communications circuitry 306 may include, for example, a network interface for enabling communications with a wired or wireless communications network. For example, the communications circuitry 306 may include one or more network interface cards, antennas, buses, switches, routers, modems, and supporting hardware and/or software, or any other device suitable for enabling communications via a network. Additionally or alternatively, in some embodiments the communication interface may include the circuitry for interacting with the antennas to cause transmission of signals via the antennas or to adjust receipt of signals received via the antennas. The input/output module 308 may provide for connectivity between the head mounted display (HMD) 100 and the image generator 300, as well as the instructor station 250.

The head mounted display (HMD) 100 in some embodiments further includes one or more image sensors 310, which can include Lidar sensors, video cameras, and combinations thereof. In some embodiments, the image sensors 310 include one or more cameras that capture images, videos, and/or the like surrounding the head mounted device. For example, in some embodiments, the image sensors 310 includes cameras that face outward from the head mounted display (HMD) 100, for example to the sides, above, below, and/or forward from an axis relatively normal to a wearer's eyes. In some embodiments, the image sensors 310 includes cameras that face inward from the head mounted display (HMD) 100, for example towards the eyes of a wearer. The image sensors 310 may be processed to detect objects in the environment of the head mounted display (HMD) 100 (e.g., hands, eyes, operator controls, and the like) that are associated with interacting with a virtual environment and/or depicting virtual elements in the virtual environment.

The head mounted display (HMD) 100 in some embodiments further includes one or more orientation sensors 312. In some embodiments, the orientation sensors 312 include one or more devices that are specially configured to measure orientation and/or position data associated with the head mounted display (HMD) 100. In some embodiments, the orientation sensors 312 includes at least one inertial measurement unit (IMU), gyroscope, accelerometer, magnetometer, LiDar sensor, and/or the like. In some embodiments, the one or more orientation sensors 312 includes one or more image sensors, for example of the image sensors 310, where orientation and/or position is determined from captured image data. The orientation sensors may detect and/or measure changes in rotation and/or position of the head mounted display (HMD) 100. For example, the orientation sensors 312 may measure data indicating the orientation and/or position of the apparatus 100 as the head mounted device is repositioned via a test stand.

The head mounted display (HMD) 100 in some embodiments further includes one or more motion sensors 314. In some embodiments, the motion sensors 314 include a vibration motion sensor, a passive infrared sensor, a hybrid type sensor, and/or the like that detects movement and/or reorientation of the apparatus 100. In some embodiments, the motion sensors 314 include one or more of the orientation sensors 312. In some other embodiments, the motion sensors 314 include one or more of the image sensors 310, for example where motion is detected from captured image data.

In some embodiments, one or more of the circuitry of apparatus 100 is combined into a single module configured to perform some, or all, of the actions described with respect to the individual circuitry. For example, in some embodiments, the processor 302 is combined with one or more of the other circuitry components of the head mounted display (HMD) 100.

Figure 4:
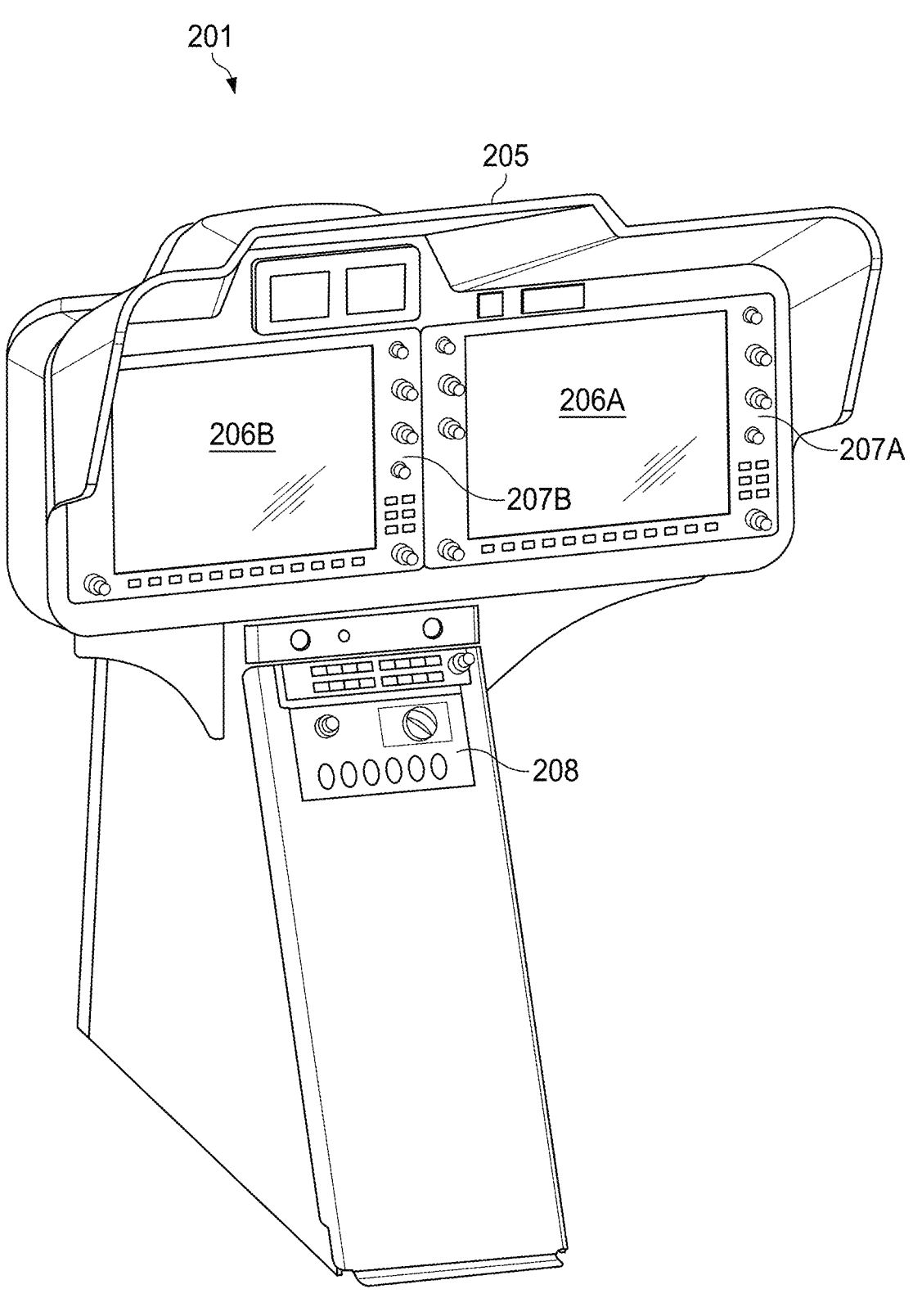
FIG. 4 is a perspective view of the control panel of a tactile cockpit for the simulation environment, in accordance with some embodiments.

FIG. 4 illustrates an embodiment of an instrument panel 205 that can provide one example of the physical elements for the tactile cockpit 201. The instrument panel 205 is a physical panel that can provide tactile feel to the user, and includes elements for virtual representation in the head mounted display (HMD) 100. In some embodiments, the instrument panel 205, as well as the primary controls 202, are examples of physical elements to which virtual models are to be aligned by testing methods described herein. For example, the physical elements of the instrument panel 205 to which the virtual models displayed the user through the head mounted display (HMD) 100 can be controls, gauges, switchgear or any element requiring user input in the applications of vehicle control simulations. The physical elements can be controls, gauges, switchgear or any element requiring user input in the applications of vehicle control simulations, that the user can touch, e.g., physically touch.

Referring to FIG. 4, in some embodiments, the instrument panel 205 may include two display units 206a, 206b, in which the content of the display units 206a, 206b may be projected to the user as elements of the virtual environment through the head mounted display (HMD) 100. The first display unit 206a may have switch gear 207a. The second display unit 2o6b may haves its own switchgear 2o7b. Additional switchgear 208 may be separate from the displays and may also be mounted to a portion of the instrument panel 205. The instrument panel 205, the displays 206a, 206b, the switchgear 207a, 207b, 208 and the controls (e.g., primary controls 202) may all serve as physical elements that are depicted in the virtual world using virtual models. The test methods may employ any of these physical elements for being reference point in the virtual environment to check alignment of the overlay for the virtual models to the physical elements. The image generator 300 can provide the virtual models, and can provide simulation data to be depicted corresponding to the display units 206a, 206b to be viewed by the user during the simulation.

For example, a first display unit 206a may serve as a primary flight display, and the second display unit 206b as a multi-function display, or vice versa. The first display unit 206a may include switchgear 207a, which are tactile switches. The switchgear 207a may be employed for controlling functions on the first display unit 20a, which can include displaying flight characteristics for the vehicle being simulated, as controlled in the simulation by the user wearing the head mounted display (HMD) 100. For example, when the first display unit 206a is displaying information for the primary flight display through the virtual environment projected to the user through the head mounted display (HMD) 100, the switch gear 207a may be suitable for adjusting settings relevant to the display of altitude, airspeed, vertical speed indicator (VSI), and heading as well as rate tapes, which are all examples of data that may be displayed on the primary flight display.

The second display unit 206b can be a multifunction display having its own switchgear 207b. The switchgear 207b for the second display unit 206b may control functions on the second display unit 206b. For example, when second display unit 206b is displaying information for the multifunction display through the virtual environment projected to the user through the head mounted display (HMD) 100, the switch gear 207b may be suitable for controlling navigation, traffic information, waypoint information, flight plan pages, procedure pages, autopilot controls and NAV and COM radio controls. For example, switchgear 207b may be used to control navigation map page with zoom, measure distance/bearing, cursor pan, cursor select navigation feature, fuel range ring, navigation ring, track vector, and wind vector. For example, the switch gear 2o7b may be used to control information directed to traffic displays on the navigation map page and traffic map page. For example, the switch gear 207b may be used for controlling information for terrain data display on navigation map page and/or a terrain map page. In some other examples, the switch gear 207b may be used for controlling waypoint information pages, which may be directed to airports, intersections, NDB, VOR and/or user set waypoints. The switchgear 207b can be used to create and store user waypoints. In yet further embodiments, the switchgear 207b can be used to control flight plan pages displayed in the virtual environment that is depicted on the multifunction display that is overlayed onto the second display unit 206b. The flight plan pages can be controlled to create, edit and store flight plans, as well as load and follow flight plans using the flight simulator's autopilot. Functions can further include vertical navigation, parallel track, invert flight plan and direct to navigation controls. In some embodiments, the switchgear 207b can also be used for accessing data and controlling settings for procedure pages to be displayed in the virtual environment that is depicted on the multifunction display that is overlayed onto the second display unit 206b for adjusting autopilot with roll, pitch, altitude hold, vertical speed, flight level change, navigation (GPS, localizer, VOR), and approach (glide slope) modes. In yet another embodiment, the NAV and COM radio tuning may be controlled for the simulation for either of the first switchgear 207a for the first display 206a and the second switchgear 207b for the second display 206. It is noted that the switchgear is not limited to only the switchgear 207a, 207b that is associated with the first and second display units 206a, 206b. For example, a third set of switchgear 208 may be associated to the instrument panel 205 at a base portion that is separate from the first and second displays 206a, 206b. The tactile cockpit 201 also includes the primary controls 202 that control yaw, pitch and roll of the vehicle being controlled in the simulation. Tactile controls may also be present for controlling other vehicles controls, such as engine management, e.g., throttle, prime, etc.

The switchgear 207a, 207b, 208 and the controls, e.g., primary controls 202, all provide tactile feel to the user while operating the simulation in a virtual environment provided by the head mounted display (HMD) 100. These controls of the switchgear may include buttons, rockers, switches, knobs, simulated touch screens, joy sticks, levers etc. The controls may be tactile controls. Tactile is the integration of multi-sensory triggers within physical objects, allowing "real world" interactions with technology. The multi-sensory triggers to provide the tactile feature of the controls can include clicking, vibration, resistance, etc.

These controls are examples of physical elements to which virtual models are to be aligned by the testing methods described herein, which can provide for the integration of hand tracking spatial accuracy validation and physical/virtual overlay alignment validation in a single test.

As noted above, the tactile cockpit 201 may include a simulator station housing 210, which includes a frame structure, as depicted in FIG. 1. The frame structure including mounting points for secondary controls, e.g., throttle controls. The frame structure for the simulator station housing 210 also includes virtual reality (VR) sensors 800, as depicted in FIG. 1. Virtual reality devices, such as the head mounted display (HMD) 100 that provides the virtual environment for the simulator can include numerous sensors to measure the motions made by the user and pass them to the VR processor. One VR sensor is a motion sensor for detecting the movement and rotation of the user's head and hands in 3DoF (Degrees of Freedom), which may include accelerometers and gyroscopes. The VR sensors 800 mounted to the frame structure for the simulator station housing 210 may also include cameras. The cameras attached to the simulator station housing 210 may work in combination with or independently from the sensors on the head mounted display (HMD) 100 for detecting physical elements to be overlaid with the virtual environment and tracking hand motions of the user for application to the virtual environment during the simulation.

Figure 8:
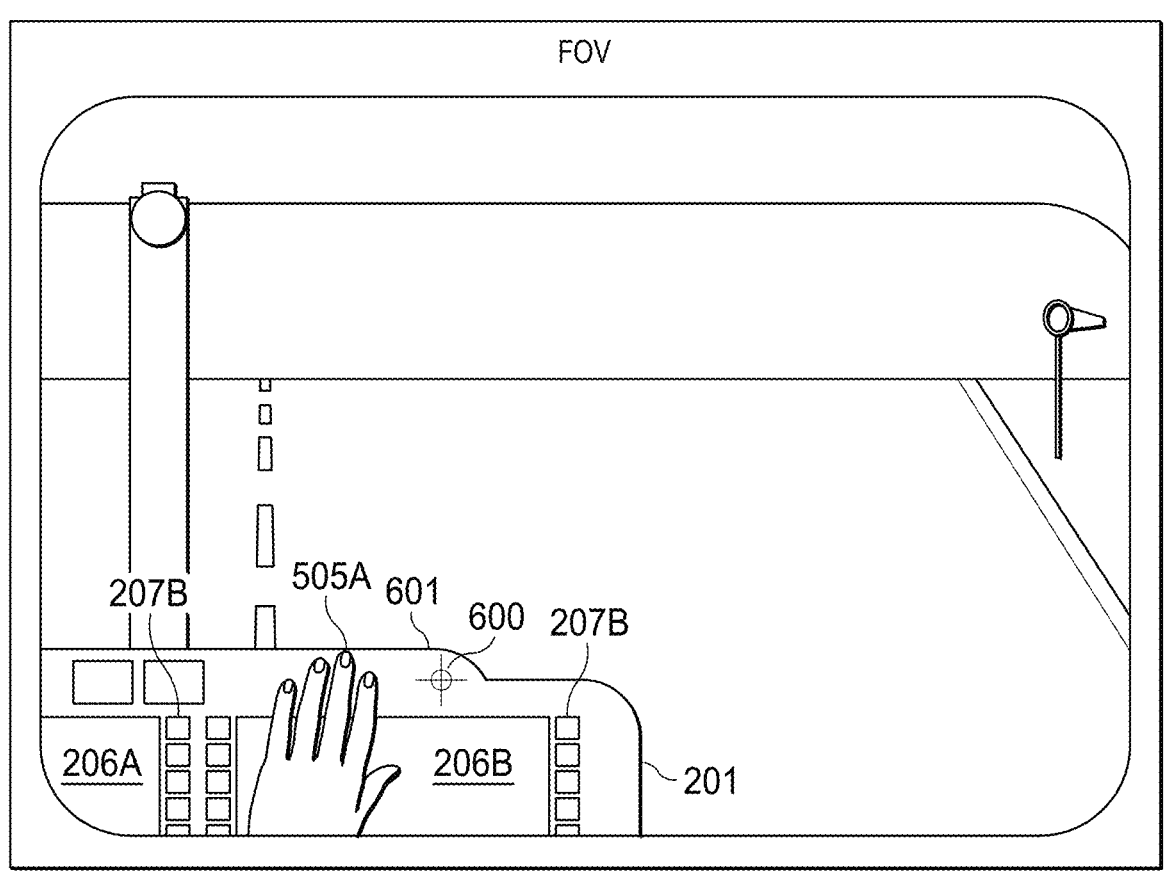
FIG. 8 is an illustrated view of the testing scene that is projected to the user through the head mounted display (HMD), in accordance with some embodiments.

Referring to FIGS. 1 and 2, the head mounted display (HMD) 100 displays images for the virtual environment to the user. The images of the virtual environment can be generated by the image generator (IG) 300. The image generator (IG) 300 can provide the images for the out the window (OTW) display of the virtual environment for the simulator. The image generator (IG) 300 can also drive all images to the first and second displays 206a, 206b, which may provide the primary flight display and the multi-function display, which can be displayed to the user through the head mounted display (HMD) 100. The image generator (IG) 300 may also produce a virtual model of the physical elements in the tactile cockpit 201. The image generator (IG) 300 can also provide a virtual model for the hand 505 of the user, e.g., a virtual pointer, and/or virtual index finger. The image generator (IG) 300 can also provide a virtual target symbol 600, as depicted in FIG. 8, which is used to designate associated virtual reference points during the testing methods for measuring spatial positioning in a virtual reality environment.

In some embodiments, the image generator (IG) 300 may be provided by one or more of a purpose build computer, personal computers (PCs), one or multiple racks of computers, tablets, and/or any computing device that can display an image. In some embodiments, the image generator (IG) 300 may employ a database of images, e.g., computer generated (CG) objects, for use in providing the virtual environment to the head mounted display (HMD) 100. In some embodiments, the database may provide data specific to an area of interest (AOI), such as cities, airports, airfields, or military bases. Further, the database may provide information on terrain including information directed to coastlines, powerlines, trees, buildings, towers, etc. For example, the database of simulation data can be used by the image generator (IG) to provide a real time day simulation that can include lighting for dusk and dawn scenarios. The simulation can include weather effects, such as volumetric clouds, storms, e.g., thunderstorms, rain, snow, hail, sleet, etc., fog/haze and volumetric ground fog banks. The image generator (IG) 300 can provide realistic aircraft models and collision computations. For example, the image generator (IG) 300 can provide vehicle animation, e.g., animated gears, engines and or flaps for aircraft. For example, the image generator (IG) 300 can provide damage simulation, e.g., fire and/or smoke, to the vehicle being simulated. As will be described with further detail below, the image generator (IG) 300 can also generate a target symbol 600 corresponding to a virtual reference point in the virtual environment, as depicted in FIG. 8.

Figure 5:
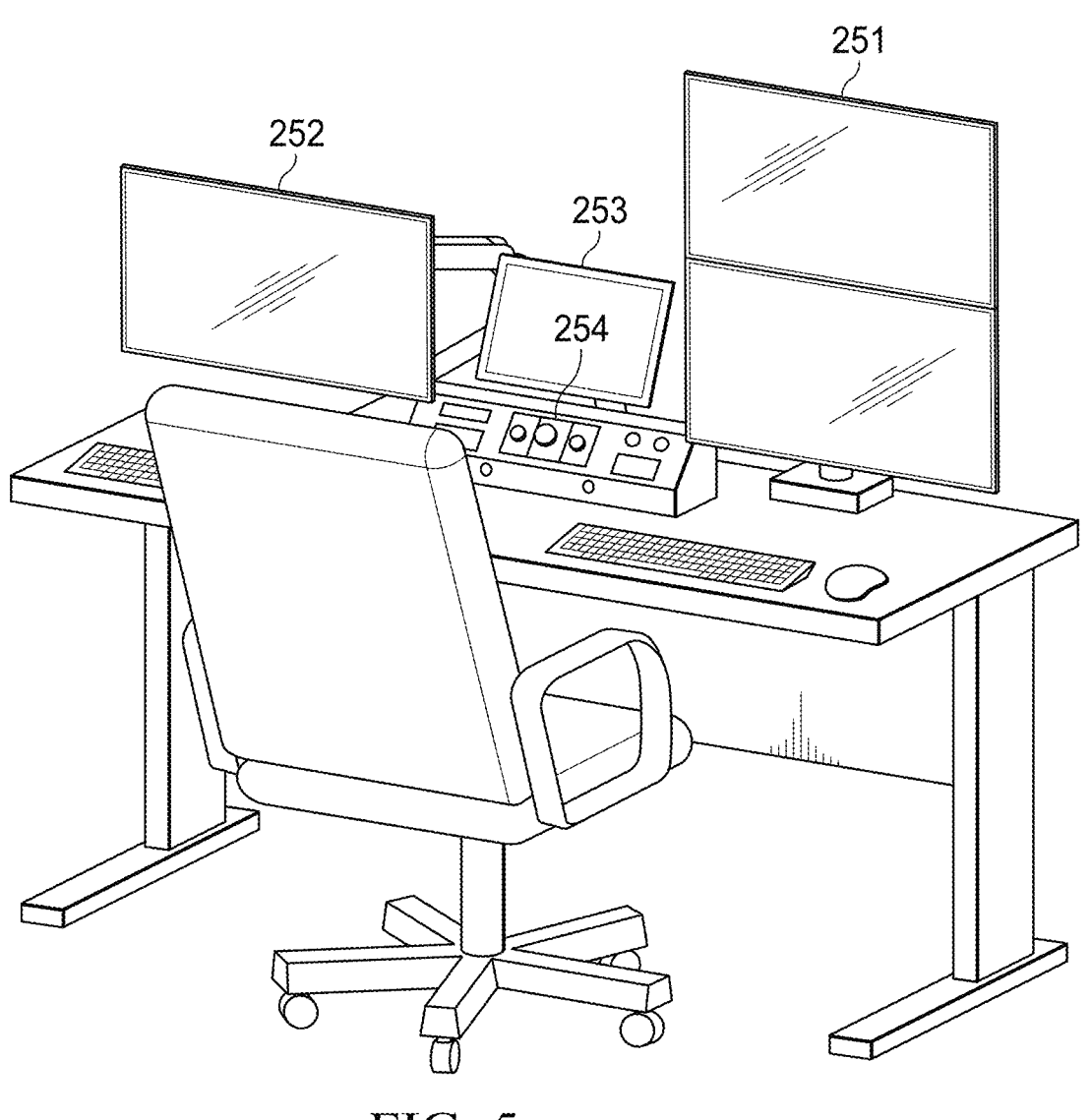
FIG. 5 is a perspective view of an instructor station for use with the simulation environment, in accordance with some embodiments.

FIG. 5 illustrates an embodiment of an instructor station 250 for use with the simulation environment. In some embodiments, the instructor station 250 can include an instructor station interface 251, and a student view repeater 252. The instructor station interface 251 includes an interface, e.g., display and data input device, e.g., keyboard and/or mouse/touch input, through which the instructor can issue commands and receive data regarding the running of the simulation. The instructor station interface 251 may include computing device running an operating system (OS), such as Microsoft Windows OS, Apple's macOS, iOS, Chrome OS and Unix and/or Linux distributions. The student view repeater 252 also includes a display, which can be used for displaying to the instructor, the viewpoint of the user (user 500 as depicted in FIG. 6) during the running of the simulation. The instructor station 250 also includes a remote operating system (ROS) 253 and controls for emergency powering off 254.

The instructor station 250 may provide the interface through which the testing may be performed. For example, an operator at the instructor station 250 can run the tests with the user at the pilot's seat 211 wearing the head mounted display (HMD) 100. The testing can include the integration of hand tracking spatial accuracy validation and physical/virtual overlay alignment validation in a single test. The test can be run through the instructor station interface 251.

FIG. 6 is an illustration of a user 500 taking the seated position of a head mounted display (HMD) user for performing a testing method for measuring spatial positioning in a virtual reality environment, in which virtual models forming the virtual reality model are overlaid upon physical elements that a user will interact with during a simulation that employs the head mounted display (HMD) 100 to provide the virtual environment, and the tactile cockpit 201 to provide the physical elements, such as switchgear 207a, 207b, 208, and primary controls 202. The virtual reality models of the virtual environment are aligned to overlay on the physical elements of the physical environment that the simulation user interacts with during the simulation.

In some embodiments, the testing methodology includes a head mounted display (HMD) 100, and physical reference points to physical elements surrounding the user of the head mounted display (HMD) that are relevant to the virtual environment of the simulation. In some embodiments, the virtual environment includes virtual models of the physical elements surrounding the user and associated virtual reference points, each designated by a virtual target symbol 600 (illustrated in FIG. 8), e.g., a brightly colored target symbol. As will be described in greater detail below, during the test, the virtual target symbol 600 is virtually placed on a portion of the virtual environment corresponding to a portion of the tactile cockpit 201. The virtual environment is generated by the image generator 300 and displayed to the user 500 through the head mounted display (HMD) 100. The user 500 uses their physical hand 505 (depicted in FIG. 6) to manipulate a virtual model 505a (depicted in FIG. 8) of their physical hand to contact the virtual target symbol 600 (depicted in FIG. 8) being displayed to the user in the virtual environment. The virtual environment includes virtual models overlying the elements of the virtual environment, on physical elements from the physical environment that the user is positioned within during the simulation. In some embodiments, by measuring the position of the hand 505 in the physical environment, e.g., touching a portion of the tactile cockpit 201 designated by the virtual target symbol 600, when the user 500 intends to touch the virtual target symbol 600 in the virtual environment, the methods can measure alignment of the virtual models to the physical elements. Measurement of the hand 505 may be made through the Lidar sensor and/or camera, e.g., image sensors 310, of the head mounted display (HMD) 100 and/or the VR sensors 800 that are mounted to the frame, e.g., simulator station housing 210.

Figure 7:
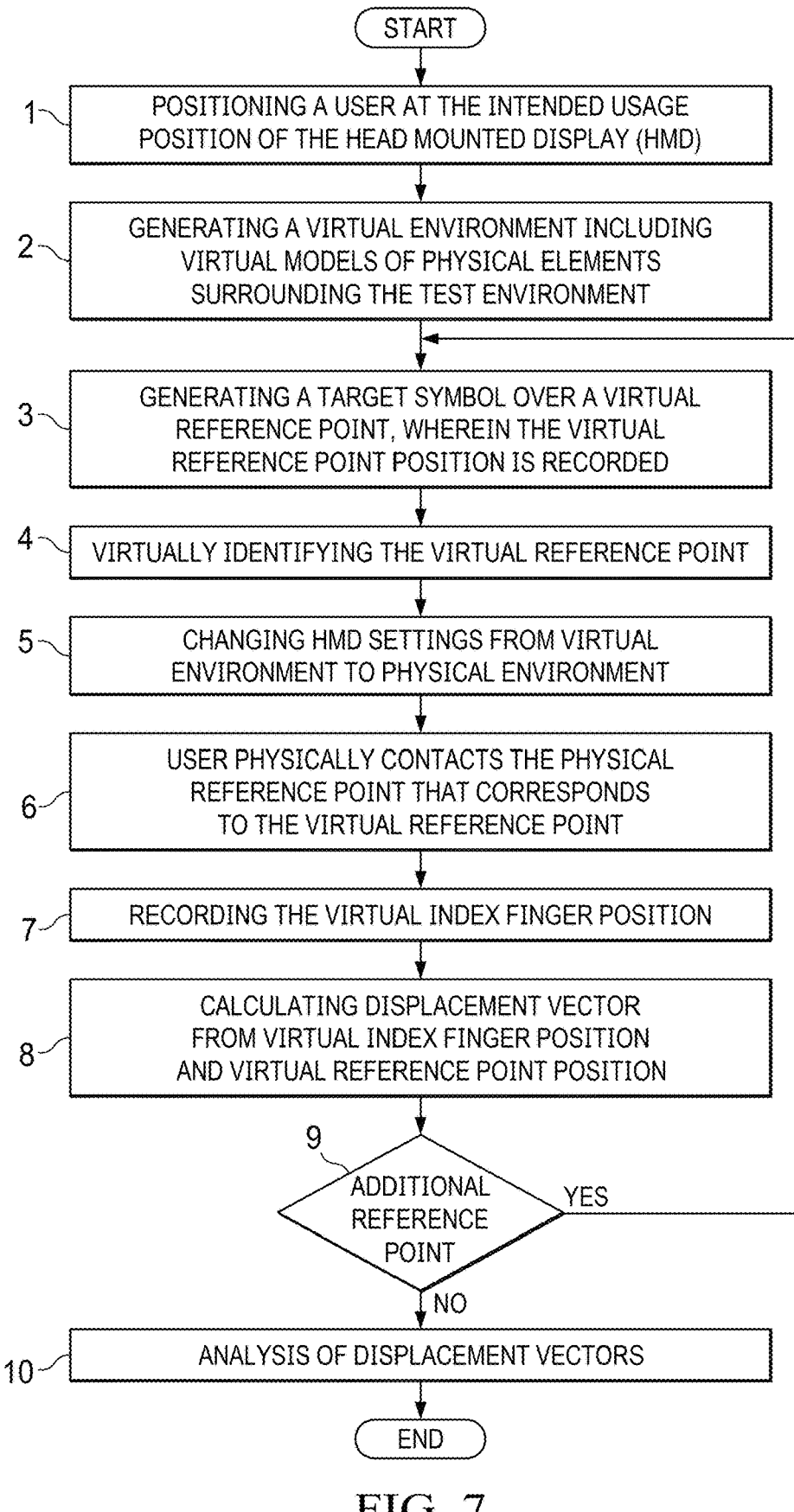
FIG. 7 is a flow/block diagram illustrating at least some steps of a testing method for measuring spatial positioning in a virtual reality environment, in accordance with some embodiments.

FIG. 7 is a flow/block diagram illustrating at least some steps of a testing method for measuring spatial positioning in a virtual reality display. The methods (e.g., computer implemented method), systems and computer program products described herein solve the problem of measuring and quantifying how closely spatial position of virtual hands 505*a*, as depicted in FIG. 8, relative to other virtual environment models matches spatial position of a user's physical hands 505, as depicted in FIG. 6, relative to other physical objects and surfaces. For example, in the virtual environment 2000, e.g., testing scene, the virtual hand 505*a* is depicted contacting a portion of the instrument panel 205 or the tactile cockpit 201 that is overlying the first and second displays 206*a*, 206*b*, which is being designated by the virtual target symbol 600. High accuracy of this relationship is critical for performance of tasks and procedures in virtual reality that incorporate tactile sensory stimulus.

Aspects of the methods are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present disclosure. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be accomplished as one step, executed concurrently, substantially concurrently, in a partially or wholly temporally overlapping manner, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

In some embodiments, the methods, systems and computer program product disclosed herein is a testing methodology utilizing components including a head mounted display (HMD) 100 and physical reference points relating to all physical elements surrounding the user 500 that are relevant to the virtual experience. An image of a virtual environment 2000 is depicted in FIG. 8, is generated and displayed within the head mounted display (HMD) 100. For example, the image may be generated by the image generator (IG) 300, which is then transmitted to the user 500 through the head mounted display (HMD) 100. The virtual environment 2000 includes virtual models of the physical elements surrounding the user 500 and associated virtual reference points, each designated by a brightly colored target symbol 600. In some embodiments, the method can provide for the integration of hand tracking spatial accuracy validation with physical/virtual overlay alignment validation into a single test.

For example, in some embodiments, the test method works by positioning a user 500 at the intended usage position of the head mounted display (HMD) 100 at block 1 of FIG. 7. The user 500 is depicted at the intended usage position in FIG. 6. The user 500 secures the head mounted display (HMD) 100 to their head per head mounted display (HMD) manufacturer guidance. The location of the user 500 including the positioning of the head mounted display (HMD) 100 relative to the tactile cockpit 201 may be measured through the various sensors in the simulation environment, such as the VR sensors 800 and the Lidar sensor of the head mounted display (HMD) 100. This step may provide a measurement of the general location of the head mounted display (HMD) 100 with respect to the physical environment of the simulation, which includes the tactile cockpit 201.

Referring to block 2 of FIG. 7, the method can continue with generating a virtual environment 2000 (as depicted in FIG. 8) including virtual models of all relevant physical elements surrounding the test operator. The physical elements are the primary controls 202 and the switchgear 207*a*, 207*b*, 208, e.g., the first and second switchgear 207*a*, 207*b* for the first and second displays 206*a*, 206*b*.

The virtual environment 2000 can be generated by the image generator (IG) 300. The image generator (IG) 300 creates the "Out the Window" (OTW) display, as well as drives images to multi-purpose/function displays (MPD/MFD) and sensor displays (e.g., forward-looking infrared, night vision goggles, radar). The image generator (IG) 300 combines 3D models, textures, lighting, and effects to create a convincing view, which is projected to the user 500 through the head mounted display (HMD) 100. The rendering techniques can include texture mapping, shading, and perspective projection. Texture mapping applies detailed images (textures) to 3D surfaces, making them appear realistic. Shading calculates lighting effects to create depth and realism.

A "virtual model" is a digital, three-dimensional representation of a physical object (e.g., the switchgear and controls), environments (tactile cockpit 201), or people (e.g., the operator's hand). The virtual models are created using computer graphics software. For example, the virtual models are firstly modeled using 3D modelling tools to create the object 3D geometries. After completion of the 3D modeling process, the models are rendered using computer graphics techniques including materials painting, texture mapping, etc. This process can be done directly on the 3D modeling software. In some embodiments, the virtual model may be a produced by a virtual model generator, which is an element of the image generator (IG) 300.

Referring to block 3 of FIG. 7, a brightly colored target symbol 600 is generated over an initial virtual reference point 601. The virtual target symbol 600 may also be generated by the image generator (IG) 300. The initial virtual reference point 601 is depicted in the virtual environment 2000, as depicted in FIG. 8. The virtual image is displayed on the screens of the head mounted display (HMD) 100, which is transmitted to the user 500. The virtual image including the virtual target symbol 600 may be referred to as a testing scene. FIG. 8 illustrates an embodiment of a testing scene that is projected to the user 500 through the head mounted display (HMD) 100.

In some embodiments, the virtual reference point has a virtual reference point position that is recorded. The virtual reference point position is recorded in three dimensions, e.g., x, y and z directions, for comparison with the later virtual pointer for the virtual hand 505*a* of the user 500. As will be further described below, the virtual pointer is an element of the user meant for designating something, which may be a virtual index finger.

Referring to block 4 of FIG. 7, upon viewing the testing scene, the user 500 locates the virtual target symbol 600, and identifies the indicated virtual reference point 601. In some embodiments, by identifying at this stage, the user 500 is visually recognizing a physical element by viewing its virtual model as designated by the virtual target symbol 600. The "virtual reference point" is in the virtual environment 2000, e.g., the test scene, and is a virtual representation of a physical element in the physical environment. The virtual target symbol 600 designates the virtual reference point. For example, once viewing the testing scene depicted in FIG. 8, the user 500 locates the virtual target symbol 600. For example, in the testing scene that is depicted in FIG. 8, the virtual target symbol 600 is positioned on the frame of the instrument panel 205 of the tactile cockpit 201. In this example, the top portion of the frame of the instrument panel 205 above the second display 206*b* that is being virtually represented in the virtual environment is the virtual reference point 601. As noted above, the virtual reference point 601 may be any physical element being depicted in the virtual environment, and may include the displays 206*a*, 2*o*6*b*, switch gear 207*a*, 207*b*, 208, and controls, such as the primary controls 202.

Referring to block 5 of FIG. 7, the display mode of the head mounted display (HMD) 100 worn by the user 500 can then be changed from the virtual mode to video stream of the physical world, e.g., physical environment. This setting may be selected by the user 500 or an operator running the test from the instructor station 250.

More particularly, the head mounted display (HMD) 100 includes a virtual environment projection mode and a physical environment projection mode. The virtual environment projection mode projects the virtual environment that is created by the image generator (IG) 300 to the user 500 through the lens of the head mounted display (HMD) 100. The physical environment projection mode projects video of the physical environment to the user 500 through the lens of the head mounted display (HMD) 100. The video of the physical environment is being projected to the user 500 through the lens of the head mounted display (HMD) 100 in real time. The physical environment projection mode displays video to the user 500 of the tactile simulation environment, e.g., including the tactile cockpit 201, the primary controls 202, and the switchgear 207*a*, 207*b* depicted on the instrument panel 205. The video for displaying the physical environment surrounding the user 500 may be recorded from sensors on the head mounted display (HMD) 100 and/or the virtual reality (VR) sensors attached to the frame of the simulator housing 210. The physical elements of the physical environment are depicted as virtual models in the virtual environment. In some embodiments, the user 500 changes the head mounted display (HMD) 100 out of virtual mode, and a video stream of the physical world in front of the head mounted display (HMD) is displayed on the head mounted display (HMD) screens. It is noted that the physical environment projection mode for the head mounted display (100) is only one embodiment of the present disclosure. For example, in some embodiments, to view the physical environment, the user can remove the head mounted display (100).

Referring to block 6 of FIG. 7, in some embodiments, the user 500 physically contacts the physical reference point that corresponds to the virtual reference point 601. For example, the user may contact the physical reference point with a physical pointer, which can be provided by the index finger of the physical hand 505 of the user 500. This step can be performed concurrently with the user 500 viewing the video of the physical world from the head mounted display (HMD) 100, in which the video may be recorded from sensors including video cameras integrated into the simulator, such as sensors integrated into the head mounted display (HMD) 100 or the VR sensors 800 that are mounted to the frame. In some examples, the user 500 can place a finger of their hand 505, e.g., their physical index finger, on the identified physical reference point 601 and hold it in place for three to five seconds.

Referring to block 7 of FIG. 7, the method may continue with recording the three-dimensional coordinate position of the virtual index finger within the virtual environment. More specifically, in some embodiments, the method may continue with recording the three-dimensional coordinate position of the virtual index finger within the virtual environment. In some embodiments, the three-dimensional coordinate position of the virtual index finger may be recorded once the virtual pointer, e.g., virtual finger, such as virtual index finger, approaches the virtual reference point 601 and becomes stationary. In some embodiments, the virtual finger will become stationary after the physical pointer, e.g., physical finger of the hand 505 of the user 500, is on the physical reference point for greater than three seconds. For example, the virtual finger will become stationary after the physical pointer, e.g., physical finger of the hand 505 of the user 500, is on the physical reference point for a time period ranging from three seconds to five seconds.

Referring to block 8 of FIG. 7, the recorded virtual index position, is compared to the virtual reference point position to generate a displacement vector. Once virtual hand position 505a stabilizes near virtual target symbol 600, the image generator (IG) software measures and outputs distance between virtual target symbol 600 and virtual index finger. The recorded virtual index position was measured from block 3 of FIG. 7. A "displacement vector" is a geometric object which encodes both a displacement and a direction. In some embodiments, the virtual target symbol 600 can then be removed from the initial virtual reference point.

Referring to block 9 of FIG. 7, a decision is then made if additional virtual reference points 601 need to be measured. If additional reference points 601 need to be measured, the process flow may loop back to block 3. For example, a virtual target symbol 600 (additional symbol) may be regenerated over the next virtual reference point in the test sequence. The virtual target then automatically transitions to the next cockpit reference point, e.g., a virtual target symbol 600 is generated on the virtual model for a physical element of the tactile cockpit 201, such as the primary controls 202 or the switchgear 207a, 207b, 208 of the instrument panel 205. The virtual target symbol 600 can guide the user 500 through alignment verification of a series of additional cockpit elements, e.g., elements of the tactile cockpit 201, through blocks 3-8 of FIG. 7. Any number of additional reference points may be generated. Each additional reference point will provide displacement vector at block 8. The user 500 can repeat the test procedure for each indicated reference point in turn until test completion.

Referring to block 9, at the conclusion of the test, when additional reference points no longer need to be measured, the displacement vectors for each tested reference point calculated at block 8 are analyzed. The magnitude of each displacement vector represents localized alignment precision of the virtual hand and virtual models with the physical hand and physical elements. For example, a failure of overlay between the virtual model in the virtual environment and the physical element in the physical environment is characterized by the vector characterizing the difference between the position of the virtual pointer and the virtual reference point position that is greater than 10 mm. In some embodiments, the method may further include adjusting the virtual environment to reduce a value of the vector characterizing the difference between the position of the virtual pointer and the virtual reference point position.

In another aspect, an apparatus 700 is provided for a testing methodology that includes a head mounted display (HMD) 100, and physical reference points to the physical elements surrounding the user 500 wearing the head mounted display (HMD) 100 that are relevant to the virtual simulator experience. In some embodiments, the apparatus 700 is an overlay system that can be integrated into the image generator (IG) 300. In some embodiments, the virtual environment generated by the image generator (IG) 300 includes virtual models of the physical elements surrounding the user 500 and associated virtual reference points 601. The virtual reference points 601 are each designated by a virtual target symbol 600, e.g., a brightly colored target symbol.

The virtual target symbol 600 produced by the apparatus 700 is virtually placed on a portion of the virtual environment corresponding to a portion of the tactile cockpit 201. The virtual environment is generated by the image generator 300 and displayed to the user 500 though the head mounted display (HMD) 100. The user 500 uses their hand 505 to touch the virtual target symbol 600 being displayed to the user in the virtual environment. The virtual environment includes virtual models overlying the elements of the virtual environment, on physical elements from the physical environment that the user is positioned within during the simulation. In some embodiments, by measuring the position of the hand 505 in the physical environment, e.g., touching a portion of the tactile cockpit 201 designated by the virtual target symbol 600, when the user 500 is intended to touch the target symbol in the virtual environment, the apparatus 700 can measure alignment of the virtual models to the physical elements. Measurement of the hand 505 may be made through the lidar sensor of the head mounted display (HMD) 100 and/or the VR sensors 800 that are mounted to the frame of the simulator station 200.

Figure 9:
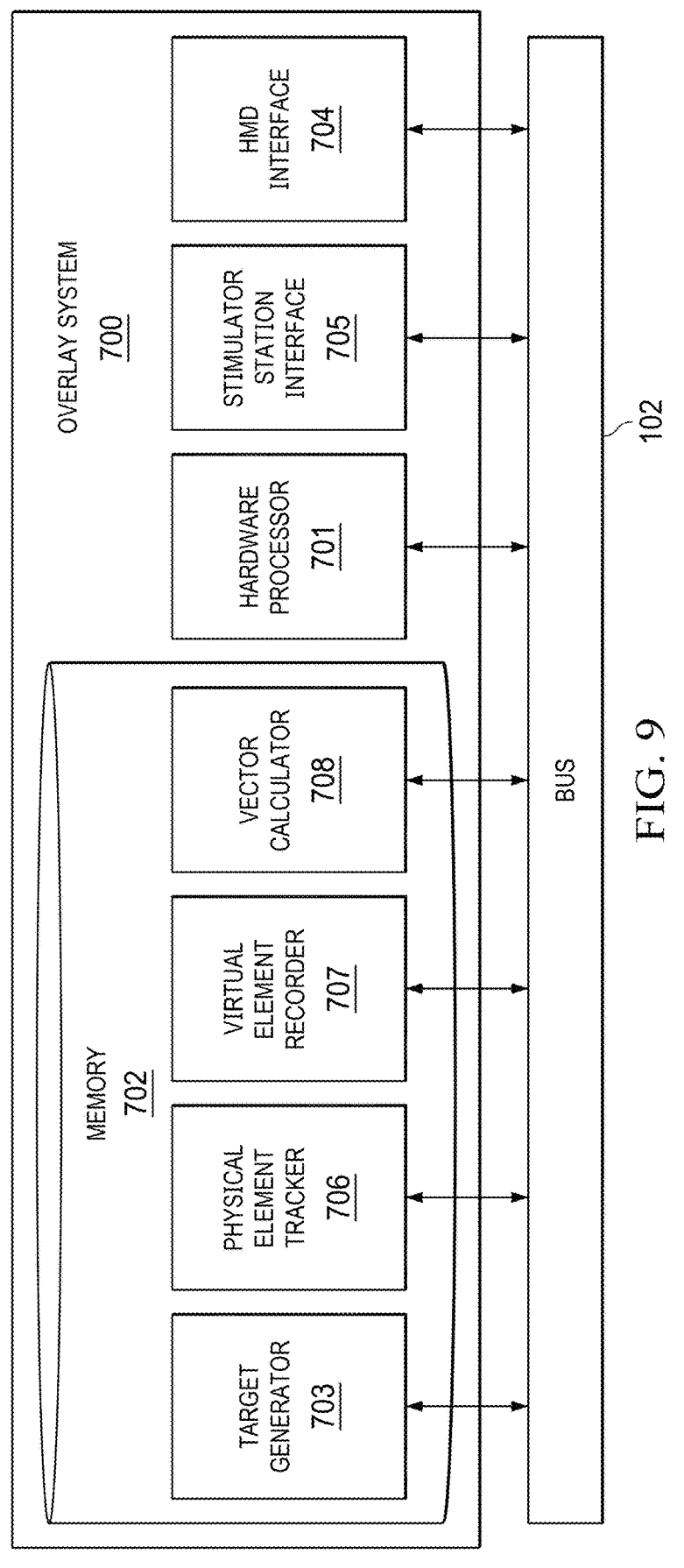
FIG. 9 is a block diagram of an image generator including an integrated testing method for measuring spatial positioning in a virtual reality environment, in accordance with some embodiments.

Referring to FIG. 9, in some embodiments, the overlay apparatus 700 can include at least one processor 701; and at least one memory 702 having computer program instructions stored thereon. In an embodiment, the computer program instructions stored on the memory 702 can include the process flow that is described above with reference to blocks 1-10, as well as any of the process steps described with reference to FIGS. 1-8.

In some embodiments, the computer program instructions stored on the memory 702 in execution with the at least one processor 701, causes the apparatus 700 to generate a target (virtual target symbol 600) to identify a virtual reference point 601 in a virtual environment. The virtual reference point 601 corresponds to a physical element in a physical environment, wherein a virtual reference point position of the virtual reference point is recorded. Further details for these functions are provided above in the description of block 3 of the method described with reference to FIG. 7. To provide this function the apparatus 700 may employ computer instructions in target generator 703 of the memory 702. The image generator 300 provides a virtual environment including virtual models of physical elements surrounding the test environment, as described in block 2 of the method depicted in FIG. 7.

Referring to FIG. 9, the apparatus 700 may also include a head mounted display (HMD) interface 705 through which the apparatus 700 can project the target on the virtual reference point in the virtual environment to a user 500 through a head mounted display (HMD) 100.

The apparatus 700 may further include a simulator station interface 705 through which overlay system may be in communication with cameras 800 that are mounted to the simulator station housing (frame) 210. From the simulator station interface 705 a video feed may be received from cameras mounted therein, and/or from the HMD interface 704 a video feed may be received from image sensors 310 of the head mounted display (HMD) 100. The apparatus 700 can project, e.g., through the HMD interface 704, the physical environment to the user 500 through the head mounted display (HMD) 100.

Figure 10:
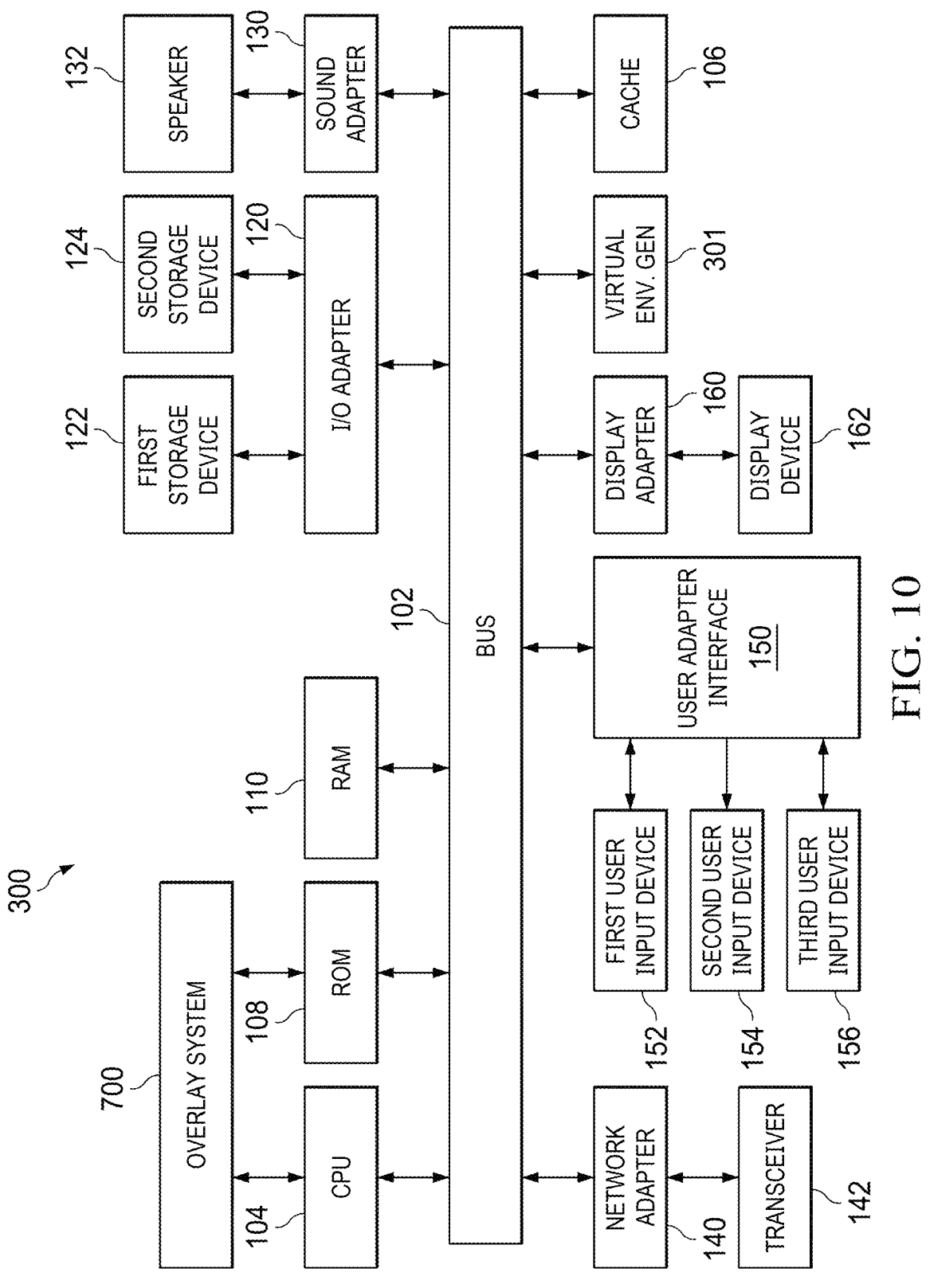
FIG. 10 is a block diagram illustrating a system that can incorporate the testing method for measuring spatial positioning in a virtual reality environment, in accordance with some embodiments.

FIG. 10 further illustrates a processing system that can include apparatus 700, e.g., the overlay system. The exemplary processing system may be integrated with the image generator 300 to which the apparatus, methods and computer program product may be applied. For example, the image generator 300 may include a virtual environment generator 301, which may be used to provide the virtual environment in which the simulation is run, as described above with reference to FIGS. 1 and 2.

Referring to FIG. 10, the processing system incorporated with the image generator 300 may include at least one processor (CPU) 104 operatively coupled to other components via a system bus 102. The system bus 102 may be in communication with the overlay system of the apparatus 700 depicted in FIG. 9. The processing system may further include a cache 106, a Read Only Memory (ROM) 108, a Random Access Memory (RAM) 110, an input/output (I/O) adapter 120, a sound adapter 130, a network adapter 140, a user interface adapter 150, and a display adapter 160, are operatively coupled to the system bus 102. The display adapter 160 may provide an interface to the head mounted display (HMD) 100 and the instructor station interface 251 and/or the student view repeater 252 of the instructor station 250 illustrated in FIG. 5.

Referring to FIG. 10, a first storage device 122 and a second storage device 124 are operatively coupled to system bus 102 by the I/O adapter 120. The storage devices 122 and 124 can be any of a disk storage device (e.g., a magnetic or optical disk storage device), a solid state magnetic device, and so forth. The storage devices 122 and 124 can be the same type of storage device or different types of storage devices. A speaker 132 is operatively coupled to system bus 102 by the sound adapter 130. A transceiver 142 is operatively coupled to system bus 102 by network adapter 140. A display device 162 is operatively coupled to system bus 102 by display adapter 160.

A first user input device 152, a second user input device 154, and a third user input device 156 are operatively coupled to system bus 102 by user interface adapter 150. The user input devices 152, 154, and 156 can be any of a keyboard, a mouse, a keypad, an image capture device, a motion sensing device, a microphone, a device incorporating the functionality of at least two of the preceding devices, and so forth. Of course, other types of input devices can also be used, while maintaining the spirit of the present invention. The input devices 152, 154, and 156 can be the same type of user input device or different types of user input devices. For example, the input devices 152, 154, and 156 may be integrated with the instructor station 250.

Of course, the processing system may also include other elements (not shown), as readily contemplated by one of skill in the art, as well as omit certain elements. For example, various other input devices and/or output devices can be included in processing system 400, depending upon the particular implementation of the same, as readily understood by one of ordinary skill in the art. For example, various types of wireless and/or wired input and/or output devices can be used. Moreover, additional processors, controllers, memories, and so forth, in various configurations can also be utilized as readily appreciated by one of ordinary skill in the art. These and other variations of the processing system 400 are readily contemplated by one of ordinary skill in the art given the teachings of the present invention provided herein.

In another aspect, the testing method may be integrated into a computer program product. For example, in some embodiments, a computer program product is may be provided by at least one non-transitory computer-readable storage medium having computer program instructions stored thereon that, in execution with at least one processor, is configured for generating a target to identify a virtual reference point in a virtual environment, the virtual reference point corresponds to a physical element in a physical environment. A virtual reference point position of the virtual reference point is recorded. In some embodiments, the instructions when executed can further project the target on the virtual reference point in the virtual environment to a user through a head mounted display, wherein the user identifies the target. In some embodiments, the instructions when executed project the physical environment to the user through the head mounted display. The instructions on the non-transitory computer-readable storage medium can also include recording a physical pointer of the user that is contacting the physical element in the physical environment that corresponds to the virtual reference point identified by the target; and generating a virtual pointer in the virtual environment corresponding to the physical pointer of the user. In some embodiments, the instructions when executed can include measuring a vector characterizing a difference between a position of the virtual pointer and the virtual reference point position in the virtual environment. The computer program produce may also be non-transitory. The computer readable storage medium can be a tangible device that can retain and store instructions for use by an instruction execution device.

The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

While this invention has been described with reference to illustrative embodiments, this description is not intended to be construed in a limiting sense. Various modifications and combinations of the illustrative embodiments, as well as other embodiments of the invention, will be apparent to persons skilled in the art upon reference to the description. It is therefore intended that the appended claims encompass any such modifications or embodiments.

What is claimed is:

1. A method, comprising:

displaying, in a head mounted display (HMD), a virtual environment comprising virtual models of physical elements surrounding a user;

generating a target identifying a virtual reference point in the virtual environment, wherein the virtual reference point corresponds to a physical element in a physical environment, and wherein a virtual reference point position of the virtual reference point is recorded;

projecting the target at the virtual reference point on a virtual model of the virtual environment to the user through the HMD, wherein the user identifies the target;

monitoring a position of a physical pointer of the user that is contacting the physical element in the physical environment that corresponds to the virtual reference point identified by the target;

generating a virtual pointer in the virtual environment corresponding to the physical pointer of the user; and measuring a vector characterizing a difference between a position of the virtual pointer and the virtual reference point position in the virtual environment.

2. The method of claim 1, wherein measuring the vector characterizing the difference between the position of the virtual pointer and the virtual reference point position comprises measuring differences between a plurality of virtual reference point positions and a plurality of positions of the target.

3. The method of claim 1, wherein a failure of overlay between a virtual model in the virtual environment and the physical element in the physical environment is characterized by the vector characterizing a difference between the position of the virtual pointer and the virtual reference point position, and by the vector being greater than 10 mm.

4. The method of claim 3, wherein the difference between the virtual reference point position and the virtual pointer that corresponds to the target indicates the failure of the overlay between the virtual model in the virtual environment and the physical element in the physical environment; and wherein the method further comprises adjusting the virtual environment to reduce a value of the vector characterizing the difference between the position of the virtual pointer and the virtual reference point position.

5. The method of claim 1, wherein the virtual environment comprises computer generated graphics of a simulation for driving a vehicle.

6. The method of claim 1, further comprising projecting the physical environment to the user through the head mounted display before the monitoring of the position of the physical pointer of the user.

7. The method of claim 6, wherein the projecting of the physical environment to the user through the head mounted display comprises a live video stream of the physical environment.

8. The method of claim 7, wherein the physical environment comprises a tactile cockpit.

9. The method of claim 8, wherein physical elements are located on the tactile cockpit, the physical elements comprising displays, switchgear, or controls.

10. The method of claim 1, wherein the generating the virtual pointer in the virtual environment corresponding to the physical pointer of the user comprises the user placing their index finger on the physical element in the physical environment that corresponds to the virtual reference point for greater than three seconds.

11. An apparatus comprising:

at least one processor; and at least one non-transitory computer readable memory connected to the at least one processor and including computer program code, wherein the at least one non-transitory computer readable memory and the computer program code are configured, with the at least one processor, to cause the apparatus to:

displaying, in a head mounted display (HMD), a virtual environment comprising virtual models of physical elements surrounding a user;

generate a target to identify a virtual reference point in the virtual environment, wherein the virtual reference point corresponds to a physical element in a physical environment, and wherein a virtual reference point position of the virtual reference point is recorded;

project the target at the virtual reference point on a virtual model of the virtual environment to the user through the HMD;

monitor a physical pointer of the user that is contacting the physical element in the physical environment that corresponds to the virtual reference point identified by the target;

generate a virtual pointer in the virtual environment corresponding to the physical pointer of the user; and measure a vector characterizing a difference between a position of the virtual pointer and the virtual reference point position in the virtual environment.

12. The apparatus of claim 11, wherein a failure of overlay between a virtual model in the virtual environment and the physical element in the physical environment is characterized by the vector characterizing the difference between the position of the virtual pointer and the virtual reference point position is greater than 10 mm.

13. The apparatus of claim 12, wherein the physical environment comprises a tactile cockpit.

14. The apparatus of claim 13, wherein physical elements are located on the tactile cockpit, the physical elements comprising displays, switchgear, or controls.

15. The apparatus of claim 11, wherein the virtual environment comprises computer generated graphics of a simulation for driving a vehicle.

16. The apparatus of claim 11, further comprising projecting the physical environment to the user through the head mounted display.

17. The apparatus of claim 16, wherein the physical environment projected to the user through the head mounted display comprises a live video stream.

18. A non-transitory computer-readable storage medium having computer program instructions stored thereon that, when executed by at least one processor, cause a device to perform:

displaying, in a head mounted display (HMD), a virtual environment comprising virtual models of physical elements surrounding a user;

generating a target to identify a virtual reference point in the virtual environment, wherein the virtual reference point corresponds to a physical element in a physical environment, and wherein a virtual reference point position of the virtual reference point is recorded;

projecting the target at the virtual reference point on a virtual model of the virtual environment to the user through the HMD, wherein the user identifies the target;

monitoring a physical pointer of the user that is contacting the physical element in the physical environment that corresponds to the virtual reference point identified by the target;

generating a virtual pointer in the virtual environment corresponding to the physical pointer of the user; and measuring a vector characterizing a difference between a position of the virtual pointer and the virtual reference point position in the virtual environment.

19. The non-transitory computer-readable storage medium of claim 18, further comprising projecting the physical environment to the user through the head mounted display before the monitoring of the position of the physical pointer of the user.

20. The non-transitory computer-readable storage medium of claim 18, wherein measuring the vector characterizing the difference between the position of the virtual pointer and the virtual reference point position comprises measuring differences between a plurality of virtual reference point positions and a plurality of positions of the target.

\* \* \* \* \*